(12) United States Patent
Schwarting et al.

(10) Patent No.: US 11,009,402 B2
(45) Date of Patent: May 18, 2021

(54) THERMOCOUPLE ASSEMBLY

(71) Applicant: United States Department of Energy, Washington, DC (US)

(72) Inventors: Nelson Schwarting, Burnt Hills, NY (US); Brian J. Lashway, Esperance, NY (US); John Crowley, Ballston Lake, NY (US); Don Rappold, Niskayuna, NY (US)

(73) Assignee: U.S. Department of Energy, Washington, DC (US)

( * ) Notice: Subject to any disclaimer, the term of this patent is extended or adjusted under 35 U.S.C. 154(b) by 160 days.

(21) Appl. No.: 15/980,875

(22) Filed: May 16, 2018

(65) Prior Publication Data

US 2019/0170590 A1    Jun. 6, 2019

Related U.S. Application Data

(60) Provisional application No. 62/506,670, filed on May 16, 2017.

(51) Int. Cl.
*G01K 1/00* (2006.01)
*G01K 1/143* (2021.01)
*G01K 7/02* (2021.01)

(52) U.S. Cl.
CPC ............... *G01K 1/143* (2013.01); *G01K 7/02* (2013.01)

(58) Field of Classification Search
CPC combination set(s) only.
See application file for complete search history.

(56) References Cited

U.S. PATENT DOCUMENTS

| 4,346,864 | A | * | 8/1982 | Feller | G01K 1/143 236/1 R |
|---|---|---|---|---|---|
| 4,684,265 | A | * | 8/1987 | Bourrelly | G01K 17/00 374/137 |
| 8,690,421 | B2 | * | 4/2014 | Wijnen | G01K 1/16 374/29 |
| 2007/0252672 | A1 | * | 11/2007 | Nyffenegger | G01K 1/08 338/28 |
| 2014/0161151 | A1 | * | 6/2014 | Proctor | G01K 1/143 374/147 |
| 2014/0167763 | A1 | * | 6/2014 | Giraldi | G01V 15/00 324/326 |

* cited by examiner

*Primary Examiner* — Lisa M Caputo
*Assistant Examiner* — Nasir U. Ahmed
(74) *Attorney, Agent, or Firm* — Jennifer R. Mahalingappa; Robert T. Burns; Brian J. Lally

(57) ABSTRACT

Disclosed is a thermocouple assembly having a resilient mount; a buffer having a first side and a second side, with the buffer first side connecting with the resilient mount; an insulator having a first side and a second side, with the insulator first side connecting with the buffer second side; and a thermocouple having a first side and a second side, the thermocouple first side connecting with the insulator second side, and the thermocouple second side being configured to be in thermal contact with an object to be measured.

10 Claims, 6 Drawing Sheets

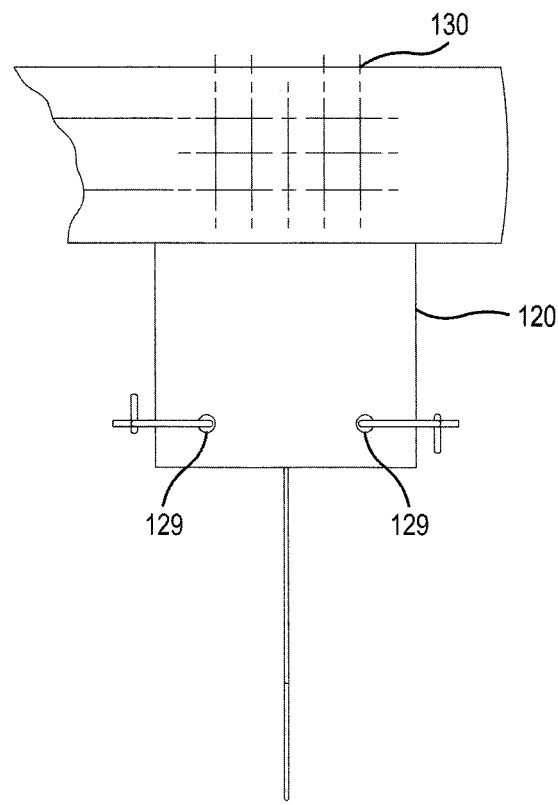
FIG. 2A
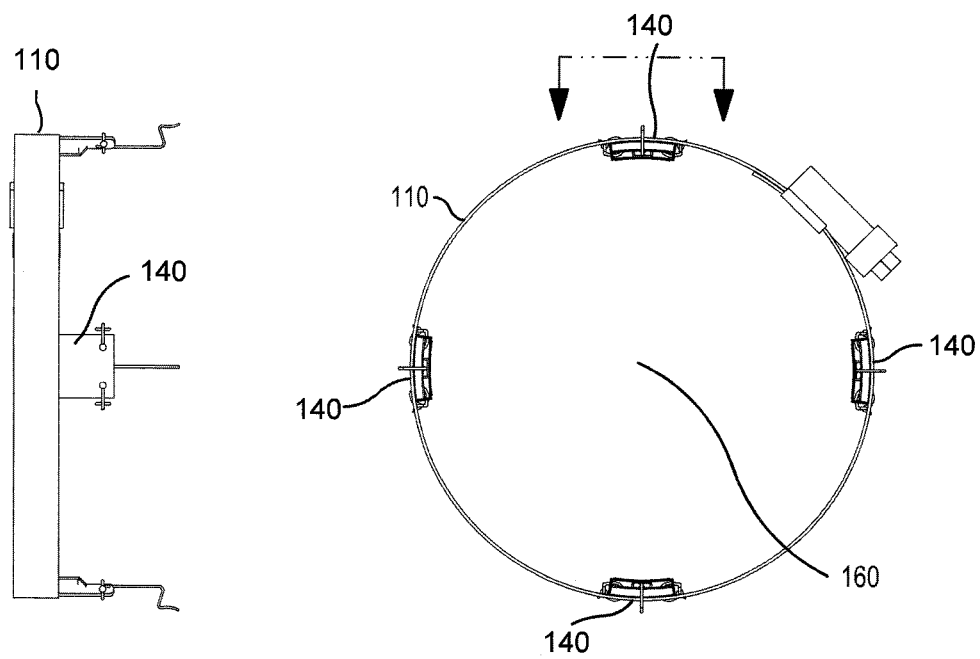
FIG. 2C  FIG. 2B

THERMOCOUPLE ASSEMBLY

CLAIM TO PRIORITY

This application incorporates by reference in its entirety and claims priority to U.S. Provisional Application 62/506,670 filed on May 16, 2017.

NOTICE OF GOVERNMENT RIGHTS

The United States Government has rights in this application and any resultant patents claiming priority to this application pursuant to contract DE-NR0000031 between the United States Department of Energy and Bechtel Marine Propulsion Corporation Knolls Atomic Power Laboratory.

TECHNOLOGICAL FIELD

The present subject matter relates to an apparatus for thermal measurement. Certain embodiments of the present subject matter relate to structures configured for the thermal measurement of cylindrical objects. In certain other embodiments, the present subject matter relates to structures configured for thermally measuring and/or monitoring pipe and/or pressure vessel nozzle surfaces to assess thermal gradients and transients, but more generally applies to an apparatus for surface temperature measurement of an object of any shape.

BACKGROUND

Thermocouples are conventionally used for measuring surface temperature of pipes, tanks and other cylindrical objects, including brazing or welding a thermocouple into a recess of a component wall. However, as applications often prohibit machining a recess into a component wall (e.g., a process pressure boundary) for housing/receiving the thermocouple structure. In other instances, modifying a component surface to position the thermocouple affects the operating temperatures themselves.

Structures for measuring surface temperature without altering the component include but are not limited to (1) spring loaded bayonet thermocouples, (2) hose clamping thermocouples to the surface, (3) attaching mineral insulated (MI) thermocouples to tabs which confine the thermocouple and clamp to an object's surface, and (4) an RdF Strapon® design which utilizes thermocouple wire in a sandwiched assembly of shim stock, Kapton®, and adhesive.

These structures also have drawbacks limiting the accuracy of the surface temperature measurement. Spring loaded bayonet thermocouples, for example, often provide inaccurate and or unstable temperature measurements due to limited sensor thermal contact area, thermal shunting (heat transfer along the probe's length), and instability of the thermocouple-to-surface contact pressure. Bayonet thermocouples are also often attached by simple hose clamps whose thermal expansion which, if different from thermal expansion of object being sensed, can cause the hose clamp to loosen and thereby compromise the magnitude and stability of the thermocouples contact pressure which affects detected temperature.

Hose clamping thermocouples to the component being measured is often only effective for one thermal cycle. After one thermal cycle, dissimilar thermal expansion of the hose clamp and the component surface may cause the hose clamp to loosen, resulting in loss of thermocouple contact pressure. With a loss of thermocouple pressure comes the potential for physical dislocation of the thermocouple from its original intended measurement location and changes to its thermal contact resistance, resulting in decreased temperature measurement accuracy.

Sheathed mineral insulated thermocouples typically have a cylindrical shape, with measured temperature being affected by thermocouple surfaces near the sensing tip. When used to measure the temperature of a relatively flat surface, the different geometries of the cylindrical sensing tip and the flat surface can compromise accuracy. In such cases, temperature measurements can be compromised by contact with or exposure to external objects or conditions such as the surrounding air temperature, and/or by heat drawn away from the thermocouple sensing region (referred to as thermal shunting) by the instrumentation mounting hardware.

The impact of these issues may be reduced by increasing thermocouple contact with the sensed surface and limiting its exposure to other objects or conditions. One way to achieve this is by applying a capacitance discharge spot welded sheet metal attachment to the object being sensed and by insulating the thermocouple from ambient air. While this configuration provides measurements more indicative of actual surface temperature, it too has drawbacks. The installation requires extensive surface preparation, for example, requiring spot welding on the surface of an object to be measured and increased installation time over alternative mechanical attachment methods.

Other configurations attempt to overcome these and other drawbacks by using an RdF Corp Strapon® shim stock type thermocouple. These configurations use Kapton® as an insulting material, with adhesives holding the assembly together that are limited to thermal environments below 450° F. Their fastening mechanisms also lack any spring function to accommodate dissimilar thermal expansion, preventing them from maintaining a continuous contact pressure on an object to be measured. Accordingly a need exists for apparatuses for repeatable, high quality temperature measurement data with long-term reliable performance demonstrated over multiple thermal cycles.

SUMMARY

The present subject matter includes a thermocouple assembly having a resilient mount; a buffer having a first side and a second side, with the buffer first side connecting with the resilient mount; an insulator having a first side and a second side, with the insulator first side connecting with the buffer second side; and a thermocouple having a first side and a second side, the thermocouple first side connecting with the insulator second side, and the thermocouple second side being configured to be in thermal contact with an object to be measured.

Certain other exemplary embodiments of the present subject matter include a method of manufacturing a thermocouple assembly, including the steps of forming a buffer into at least one of a "V" shape and a "U" shape; attaching a first surface of a thermocouple to a first surface of the buffer; attaching an insulator to a second surface of the buffer and a second surface of the thermocouple; and attaching the buffer to a resilient mount.

Still other exemplary embodiments of the present subject matter disclose a test device which includes a mandrel; a plurality of reference thermocouples embedded in an outer surface of the mandrel; and a plurality of insulated thermocouples attached to the outer surface of the mandrel. Certain of these exemplary embodiments include a thermowell thermocouple embedded in a centerline of the mandrel, and still other exemplary embodiments further include a shallow well thermocouple embedded below the outer surface of the mandrel.

BRIEF DESCRIPTION OF THE DRAWINGS

A description of the present subject matter including various embodiments thereof is presented with reference to the accompanying drawings, the description not meaning to be considered limiting in any matter, wherein:

FIGS. 2A-2C illustrate an exemplary resilient mount.

Similar reference numerals and designators in the various figures refer to like elements.

DETAILED DESCRIPTION

Figure 1:
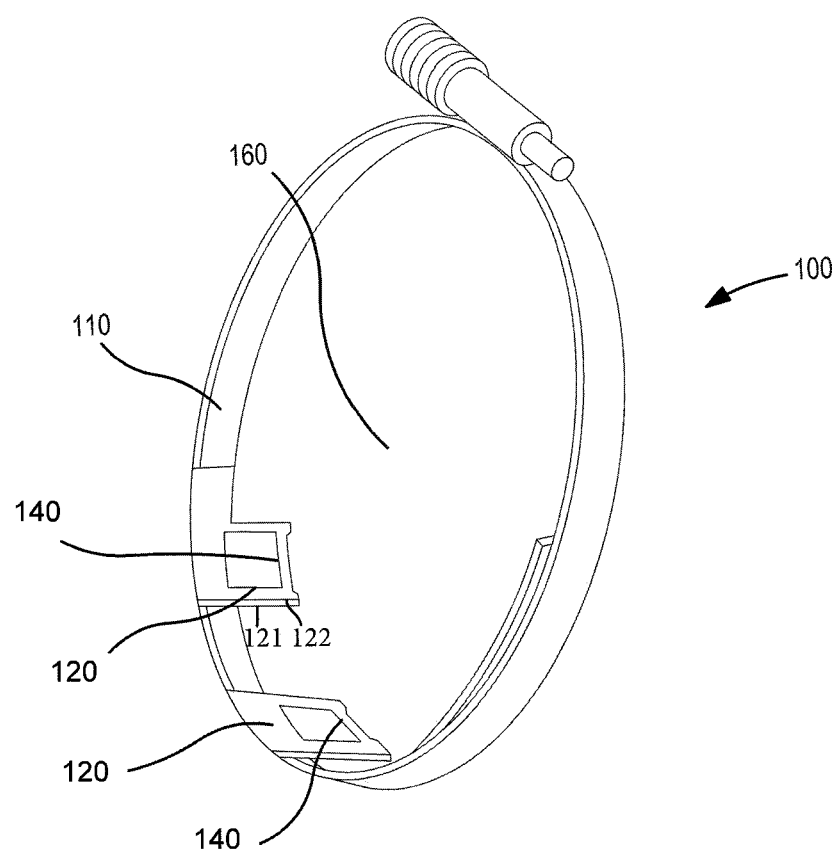
FIG. 1 illustrates an exemplary thermocouple assembly.

FIG. 1 illustrates an exemplary thermocouple assembly 100. The illustrated embodiment is shown in a ring configuration, but other configurations can be used without departing from the scope of the present subject matter. The exemplary thermocouple assembly 100 shown includes a resilient mount 110, at least one buffer 120 having a first side 121 and a second side 122, with the buffer first side 121 connecting with the resilient mount 110. The exemplary thermocouple assembly 100 further includes an insulator 130 (shown in FIG. 3C) having a first side 131 and a second side 132, with the insulator first side 131 connecting with the buffer first side 121. The exemplary thermocouple assembly also includes a thermocouple 140 having a first side 142 and a second side 144. In the exemplary embodiment shown, buffer second side 122 is shorter than first side 121 so that with thermocouple 140 connected to buffer second side 122 the combined length is shorter than first side 121, forming a first gap 133 adjacent to thermocouple 140. In this configuration, thermocouple 140 is sealed from ambient air and optionally positioned along the centerline of resilient mount 110 for increased contact pressure with an object to be measured 150. Gap 133 is compressible and/or deformable, providing strain relief for thermocouple 140. In the exemplary embodiment shown, thermocouple first side 142 connects with the insulator second side 132, and the thermocouple second side 144 is configured to be in thermal contact with an object to be measured 150 thereby creating a second gap 134 therebetween. In certain exemplary embodiments buffer 120 is configured to maintain thermocouple 140 in constant thermal contact with an object to be measured 150, and in still other exemplary embodiments buffer 120 is configured to maintain thermocouple 140 in consistent constant thermal contact with an object to be measured.

FIGS. 2A-2C illustrate an exemplary resilient mount 110, with FIG. 2A illustrating a first view, FIG. 2B illustrating a second view, and FIG. 2C illustrating a third view of exemplary resilient mount 110. As defined herein, resilient refers to a structure having sufficient elasticity such that it deforms for thermal expansion and returns to its original shape or structure upon thermal contraction such that it maintains contact with an object to be measured. Examples of resilient materials include, but are not limited to 300 Series stainless steel Bellville and Inconel A718 having a high threshold of thermal relaxation. Having material or materials with a high threshold of thermal relaxation also contribute to resiliency. In the exemplary embodiment shown, resilient mount 110 is in a ring configuration. In the configuration shown resilient mount 110 is arranged in a circular or generally circular configuration defining a void 160. This is exemplary only, however, as other configurations known to those of skill in the art can be used without departing form the scope of the present subject matter. Certain exemplary mounts include screw 127 compressing one or more washers 128 for increased resiliency to help compensate for differential thermal expansion between thermocouple assembly components and the object to be measured 150. The exemplary resilient mount 110 is configured to withstand higher temperature service than previously-known measuring devices. Unlike mounts for RdF Strapon® thermocouples (not shown), exemplary mount 110 is fabricated from materials able to withstand temperatures above 450° F. Other exemplary embodiments are fabricated from materials able to withstand temperatures up to 550° F. Still other exemplary embodiments are fabricated from materials able to withstand temperatures up to 750° F.

Certain exemplary resilient mounts 110 are configured for pre-assembly and/or modular installation and/or removal, facilitating placement of a plurality thermocouples 140 at predetermined locations in comparable time it takes to install just one thermocouple 140 in other embodiments. In these exemplary embodiments field installation is relatively quick, since angular temperature measurement locations (not shown) are pre-established based on a known object to be sensed e.g., a pipe of known diameter. Having pre-established mounting locations 112 greatly reduces the time to install the assembly 100 as the installation locations need not be marked at the installation site. These exemplary resilient mounts 110 can be more quickly installed and/or removed than previous assemblies, without compromising the specific placement and accuracy of the thermocouples 140. They are quicker to install, more resilient, more accurate (closer to true surface temperature) and help enable more stable temperature measurement than other mounts. The exemplary resilient mounts 110 are also less invasive than previously-known mounts, as they do not require detailed dimensional layout, machining of the object to be measured, or brazing or welding in the work environment of the object to be measured.

Figure 3A:
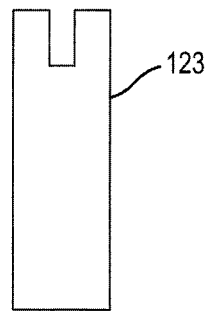
FIGS. 3A-3D illustrate an exemplary buffer assembly.
Figure 3B:
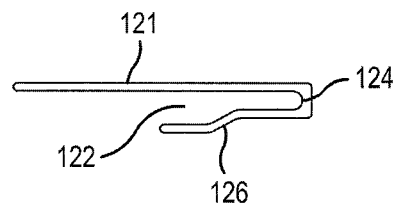
Figure 3C:
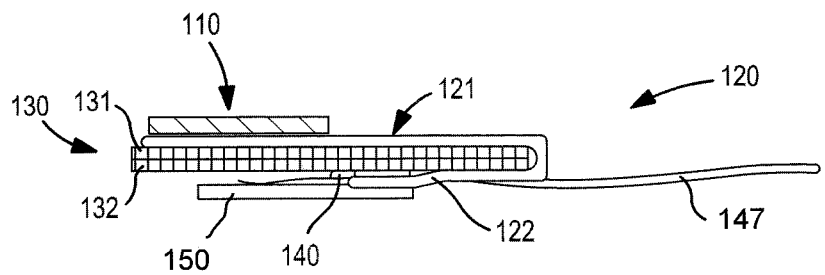
Figure 3D:
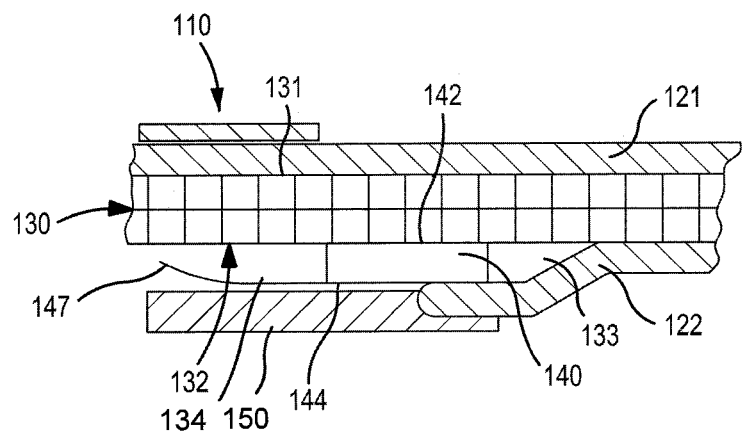

FIGS. 3A-3C illustrate an exemplary buffer assembly 120. In this example, buffer 120 includes one or more pieces 123 cut from a sheet (not shown) of 0.007" thick 316 stainless steel stock templated to the desired dimensions. The exemplary embodiment shown includes bends 124 in a "U" (FIG. 3B) and/or a "V" shape. In certain exemplary embodiments, piece 123 attaches to resilient mount 110 at a predetermined location, which in some embodiments may (but need not) be attached via welding. Certain exemplary buffers 120 optionally include clamp 126 which can (but need not be) spring loaded. In certain exemplary embodiments it is a hose clamp, and in still other exemplary embodiments it is a spring loaded hose clamp. In certain exemplary embodiments, clamp 126 is configured to maintain a contact pressure of thermocouple 140 against an object to be measured 150, and in certain other exemplary embodiments, clamp 126 is configured to maintain a constant contact pressure of thermocouple 140 against an object to be measured 150, and in still other exemplary embodiments clamp 126 is configured to maintain a consistent constant contact pressure of thermocouple 140 against an object to be measured 150. These exemplary embodiments help maintain thermocouple 140 in thermal contact with object to be measured 150, even during large and/or repeated thermal cycles. Other methods of maintaining contact known to those of skill in the art can be used in place or in addition to a clamp without departing from the scope of the present subject matter.

In certain exemplary embodiments, buffer 120 is selected from material or materials having a higher thermal resistance than thermocouple 140 to help thermally isolate thermocouple 140 from the ambient environment and/or prevent thermal contact with or exposure to external objects or conditions such as the surrounding air temperature. This limits the heat drawn away from the thermocouple sensing region (referred to as thermal shunting) by the buffer and surrounding hardware. Certain exemplary embodiments include insulator 130 (as shown in FIG. 3C, for example). The exemplary insulator 130 has first side 131 and second side 132, with insulator first side 131 positioned proximate, in some embodiments in direct contact, with buffer first side 121. In the exemplary embodiment shown, insulator second side 132 is in direct contact with thermocouple first side 142 and, in the example shown, thermocouple second side 144 is configured to be in thermal contact with an object to be measured 150. In certain exemplary embodiments, insulator 130 attaches to resilient mount 110 with a mechanical fastener extending into and/or through one or more holes 129 in buffer 120 and/or insulator 130. In the exemplary embodiment shown, a 0.020" Alloy 600 wire (not shown) secures thermocouple 140 to buffer 120 and/or insulator 130. Other securing methods known to those of skill in the art such as adhesives, screws, pins, etc. can also be used (in addition to or in place of wire) without departing from the scope of the present subject matter.

Figure 4:
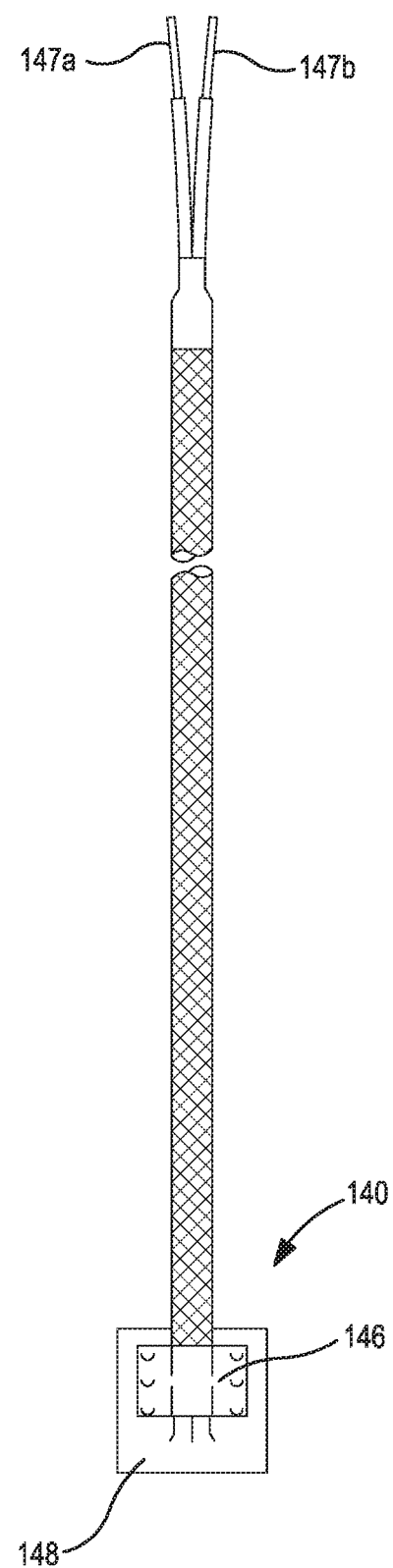
FIG. 4 illustrates an exemplary thermocouple.

FIG. 4 illustrates an exemplary thermocouple 140. The exemplary thermocouple 140 of FIG. 4 includes a main body 146 and two leads 147a/147b. In certain exemplary embodiments, thermocouple 140 is a passive self-energized bi-metallic device. Examples include, but are not limited to, ANSI Standard instrument types K, J, and T. Other thermocouples can be used without departing from the scope of the present subject matter. In the exemplary embodiment shown, leads 147a and 147b attach to a thermally conductive material 148 in thermal contact with an object to be measured 150. The thermally conductive material 148 can, but need not be, metal and can, but need not be, in direct thermal contact with the object to be measured 150. The exemplary thermocouple 140 shown is in a flat, flexible sheet configuration, giving it superior surface contact and heat transfer with object to be measured 150, which helps enable a more accurate temperature reading. This exemplary thermocouple 140 has a more stable contact with object to be monitored 150, and is less subject (and in some exemplary embodiments not subject) to vibration or contact resistance instability, as there is no unsupported moment arm extending outward to receive and/or amplify vibration. In certain exemplary embodiments, thermocouple 140 is configured to exclude ambient temperature from wire leads 147a/147b to isolate the temperature of the object to be measured 150. Leads 147a and 147b connect with extension wiring (not shown) connecting to stand alone or networked data acquisition systems for recording, displaying, and/or processing temperature readings.

Figure 5:
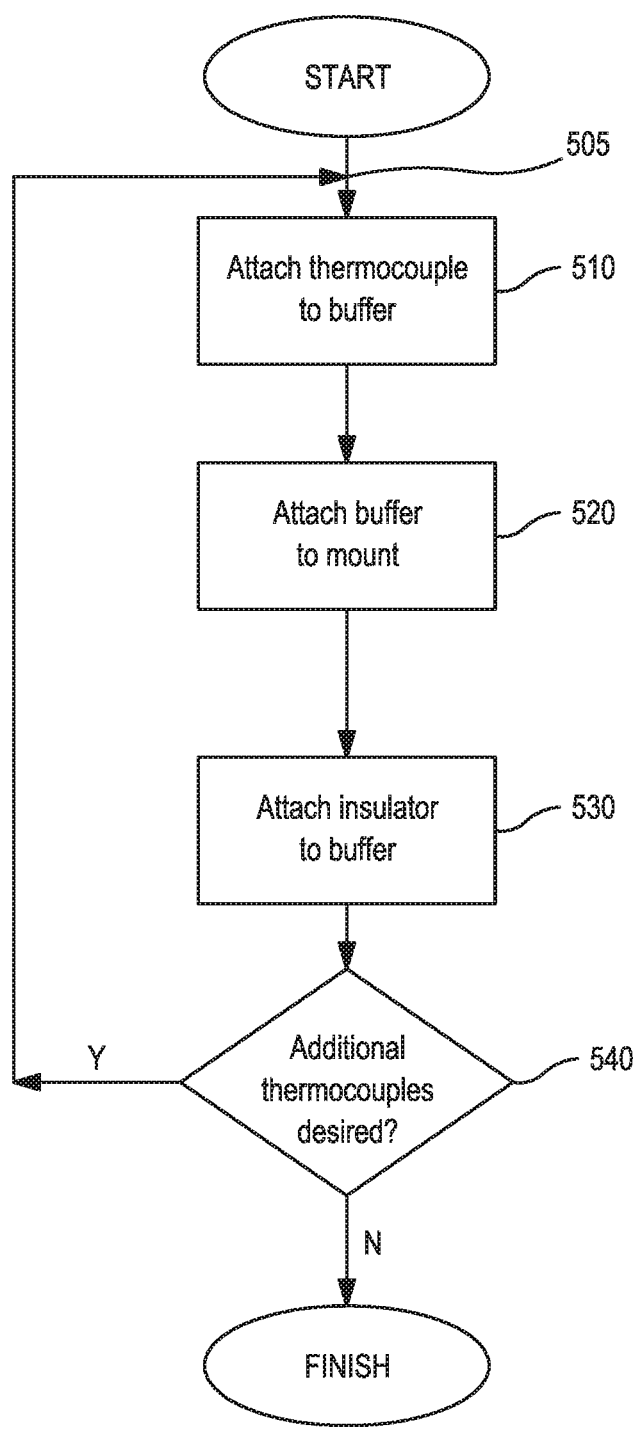
FIG. 5 illustrates an exemplary method of making a thermocouple assembly.

FIG. 5 illustrates an exemplary method of making a thermocouple assembly. The order of steps shown in FIG. 5 is exemplary only, as a person of skill in the art would understand how to alter the order without departing from the scope of the present subject matter. In the exemplary method shown, thermocouple 140 is attached to buffer 120 in step 510. In step 520 buffer 120 is attached to mount 110, in step 530 insulator 130 is attached to buffer 110. In step 540 a decision is made as to whether additional thermocouples 140 are desired. If the yes the process is repeated and if no, the process is complete.

In certain exemplary embodiments, step 510 is accomplished by welding thermocouple 140 to buffer 120. In certain exemplary methods this is accomplished using capacitance discharge spot welding. In certain exemplary embodiments, for example, thermocouple 140 may be welded to a portion of buffer 120 which includes 316 stainless steel shim stock 123/124. Thermocouple 140 is attached using a capacitance discharge spot welder (approximately 250 watt second output) equipped with pincer type electrodes. A high heat setting (approximately 80%-90% power) is used with a time setting that may be adjusted (e.g., 10%-20% of the maximum machine time setting) to avoid burning through buffer 120. In certain exemplary embodiments, step 520 is accomplished by welding buffer second side 122 to thermocouple 140 (which can, but need not be a Watlow #75XKSGA048D). These attachment methods are exemplary only, however, as other welding power and/or time settings may be used without departing from the scope of the present subject matter. Attachment methods other than welding, in place of or in addition to those described, can be used without departing from the scope of the present subject matter.

In step 530, insulator 130 is attached to buffer 120. In certain exemplary methods, step 530 is accomplished by inserting insulator 130 between buffer first side 121 and thermocouple 140, pinching buffer 120 to capture insulator 130, placing upper shim stock 123, insulator 130, and lower shim stock 124 on a block (not shown), and piercing buffer 120 with a piercing tool to produce a hole 129 through buffer 120. In certain exemplary methods this is accomplished by removing the piercing tool and routing a piece of wire (not shown) (which can but need not be 0.020 inch diameter Alloy 600 wire) through hole 129 and securing the wire to resilient mount 110 and/or buffer 120. In some embodiments, buffer 120 may be 0.007" 316 stainless steel annealed. In the exemplary method shown, buffer 120 attaches on first side 121 to insulator 130 (which in some embodiments may be Mil-C-20079H Fiberglass Tape). In certain exemplary methods insulator 130 is at least in part a military specification pipe hanger liner. Other methods of attachment known to those of skill in the art may be used in place of or in addition to the method described without departing from the scope of the present subject matter.

In the exemplary method shown, at step 540 a determination is made as to whether to install additional thermocouples 140 to resilient mount 110. If additional thermocouples are desired, such as (for example) when resilient mount 110 is a ring configured to sense a pipe, steps 510, 520, and 530 (and, optionally, 505) are repeated until the desired number of thermocouples are installed.

Certain exemplary methods optionally include step 505, in which attachment locations are marked on resilient mount 110. This step includes marking attachment locations on a template (not shown) for resilient mount 110 to prepare for prior fabrication and assembly for subsequent installation on a known element. In certain exemplary embodiments having a circular mount 110 it includes the step (not shown) of adding additional space (an additional 1/8", for example) to the resilient mount diameter to account for the impact of compressed insulator(s) 130 on the effective diameter. In these exemplary embodiments insulator 130 changes the effective diameter of mount 110, so the initial diameter of mount 110 is increased to account for this change to help ensure proper location and fit of thermocouple(s) 140.

In certain exemplary methods step 505 includes transferring one or more thermocouple locations (not shown) from a template (not shown) to clamp 126 by placing clamp 126 on the template and marking a location (not shown). In certain exemplary embodiments, thermocouple assemblies 100 are attached to clamp 126 by spot welding. In some exemplary methods, needle nose vise grips or other positioning tools may hold buffer 120 in place while welding. Other methods of attaching buffer 120 to clamp 126 can be used without departing from the scope of the present subject matter. These methods are exemplary only, as other attaching methods and/or components known to those of skill in the art can be used to fashion the thermocouple assembly 100 without departing from the scope of the present subject matter.

Figure 6:
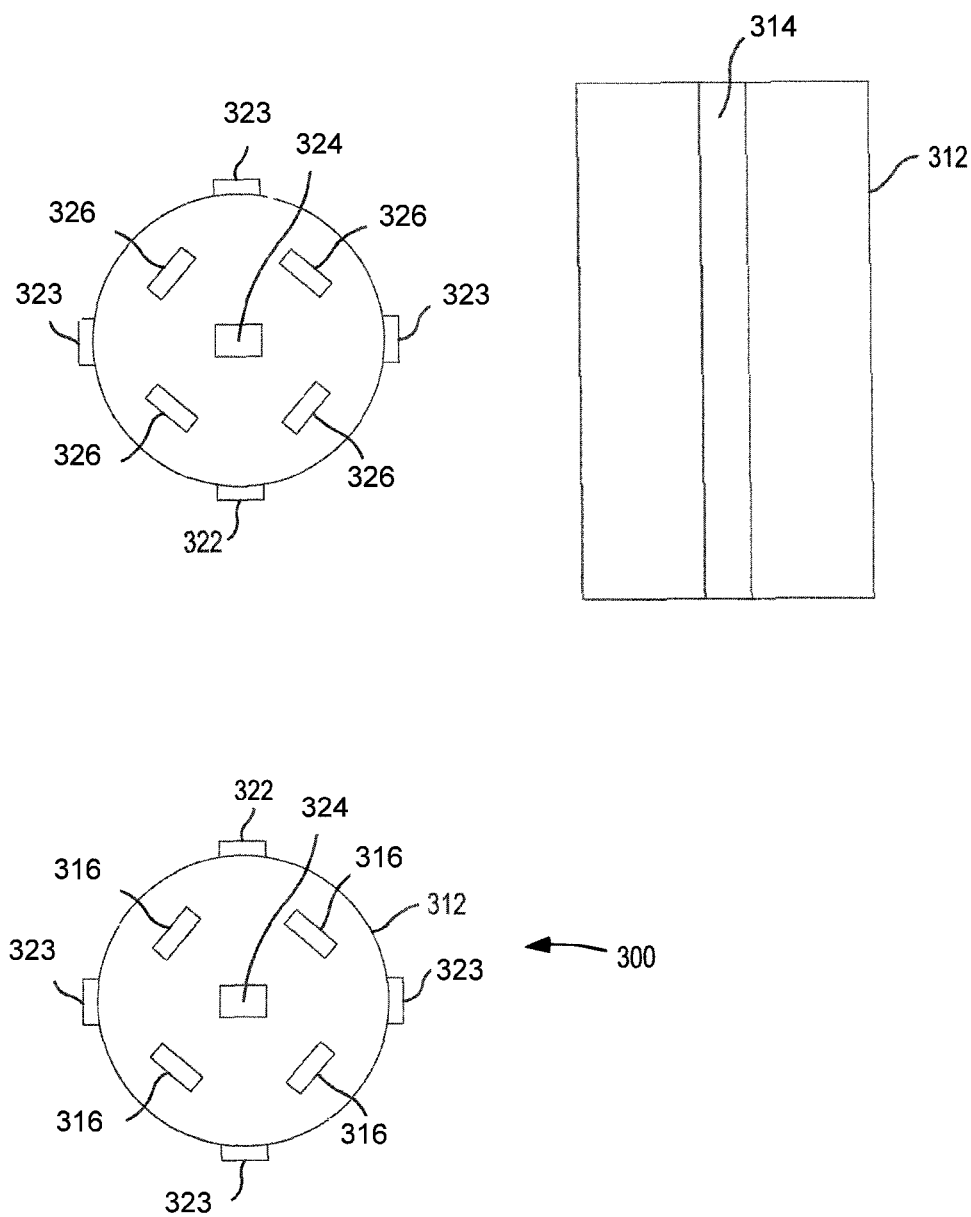
FIG. 6 illustrates an exemplary test assembly.

FIG. 6 illustrates an exemplary test assembly 300. In the exemplary assembly of FIG. 6, stock thermocouples having a manufacturer's representative's calibration records were obtained to estimate optimum efficiency of the tested thermocouples. Although calibrated reference thermocouples 322 were used in certain of these exemplary assemblies 300, supplemental validation can be optionally performed if the stock thermocouple calibrations were conducted in air (i.e., not performed in contact with a solid surface), and/or the actual calibration range did not fully encompass the temperature range of the thermocouple assembly 100 service applications. In certain exemplary tests, pretest validation proved that the fabrication and handling processes did not adversely affect any individual thermocouple measurement capability (i.e., no cold working effects).

In the exemplary embodiment shown, mandrels 310 (which can, but need not be solid steel) were fabricated for component diameters to be monitored by a thermocouple assembly 100. In the exemplary embodiment shown, much of the monitoring work was on 3" National Pipe Size (NPS) with an outside diameter of 3.5". Mandrel 310 includes at least one reference thermocouple 322 which can (but need not be a 0.040" Ø mineral insulated special limits thermocouples) on the mandrel surface 312. Other reference thermocouples known to those of skill in the art can be used without departing from the scope of the present subject matter. The exemplary mandrel 310 further includes surface thermocouples 323, centerline thermocouples 324, and shallow wall thermocouples 326. In the exemplary embodiment shown, reference thermocouples 322 were used to check thermocouple assembly thermocouple 140 precision and responsiveness. Reference thermocouples 322 were procured to special limits of error certified to ±1° F. in the intended application range. As shown in the exemplary embodiment of FIG. 6, reference thermocouple 322 is insulated from oven temperatures so that it more accurately measures the surface temperature of mandrel 310. The data produced during the exemplary oven validation tests were evaluated using a root-mean-square measurement uncertainty analytical method that compared each ring thermocouple reading to a local reference thermocouple and accounted for the reference thermocouple error.

Special limit reference thermocouples, calibrated and determined to have an accuracy of ±1° F. in the temperature range of 32° F. to 600° F. were installed in a mandrel 310 sized to have the same dimensions as a pipe intended to be monitored. One reference thermocouple 322 was located in a cylindrical bore in the approximate center of mandrel 310. Other reference thermocouples were located in shallow grooves at the outer edge of mandrel 310 at locations corresponding to thermocouple 140 locations on the assembly 100 being tested. Each thermocouple assembly 100 tested was installed on mandrel 310 such that the thermocouples 140 were positioned over a corresponding reference thermocouple 322. Certain exemplary mandrels 310 optionally included a centerline thermowell 314 and/or a shallow thermowell 316 located below mandrel surface 312. The centerline and/or the shallow wall thermocouples 324/326 were compared to surface thermocouple(s) 323 to determine when mandrel 310 was hotter or colder than its ambient environment, and to determine the influence of any ambient temperature difference(s).

Exemplary mandrel 310 was placed in an oven and allowed to reach isothermal conditions of approximately 470° F. Reference thermocouples 322 and thermocouple 140 data were collected in one minute intervals using a calibrated benchtop data acquisition system (not shown). The oven temperature set point was then reduced to establish a large temperature difference between the oven chamber and mandrel 310, which created a more prototypical condition for the intended thermocouple assembly 100 application. The difference between the reference thermocouples 322 and the thermocouples 140 was determined at each position for a cool down from approximately 470° F. to 100° F. Examples are shown in the table below.

Example of Thermocouple Ring Measurement Uncertainty

| Ring Number | Thermocouple Circumferential Location | ΔT between reference thermocouple and prototype thermocouple (° F.) (95% confidence)[1] | Thermocouple measurement uncertainty[2] (° F.) (rounded to nearest ° F.) | Bounding ring measurement uncertainty (° F.) (rounded to nearest ° F.) | Bounding total measurement uncertainty (° F.) (rounded to nearest ° F.) |
|---|---|---|---|---|---|
| 1 | Top | ±2.4 | ±2 | ±5 | ±5 [3,4] |
|   | Mid | ±1.9 | ±2 |   |   |
|   | Mid | ±1.8 | ±2 |   |   |
|   | Bottom | ±1.9 | ±2 |   |   |
| 2 | Top | ±2.3 | ±2 | ±4 |   |
|   | Mid | ±2.2 | ±2 |   |   |
|   | Mid | ±4.2 | ±4 |   |   |
|   | Bottom | ±2.2 | ±2 |   |   |
| 3 | Top | ±2.6 | ±3 | ±3 |   |
|   | Mid | ±1.8 | ±2 |   |   |
|   | Mid | ±1.9 | ±2 |   |   |
|   | Bottom | ±1.8 | ±2 |   |   |

-continued

| Ring Number | Thermocouple Circumferential Location | ΔT between reference thermocouple and prototype thermocouple (° F.) (95% confidence)[1] | Thermocouple measurement uncertainty[2] (° F.) (rounded to nearest ° F.) | Bounding ring measurement uncertainty (° F.) (rounded to nearest ° F.) | Bounding total measurement uncertainty (° F.) (rounded to nearest ° F.) |
|---|---|---|---|---|---|
| 4 | Top | ±1.6 | ±2 | ±5 | |
|   | Mid | ±1.9 | ±2 | | |
|   | Mid | ±3.8 | ±4 | | |
|   | Bottom | ±4.8 | ±5 | | |
| 5 | Top | ±1.9 | ±2 | ±3 | |
|   | Mid | ±2.5 | ±3 | | |
|   | Mid | ±2.1 | ±2 | | |
|   | Bottom | ±2.1 | ±2 | | |

5. Mean ± 2σ
6. Calculated using root mean square of the reference thermocouple calibration accuracy value of 1° F. (from the thermocouple certifications) and the 95% confidence ΔT difference value between the reference thermocouple and the prototype thermocouple obtained during preoperational testing.
7. Based on the assessment of >400,000 data points
8. Measured at a lower bound temperature of 100° F. to 120° F.

As shown in the table above, a root-mean-square (RMS) evaluation of these data at a 95% confidence interval (i.e. the thermocouple measurement reproducibility error) and the reference thermocouple error was as the square root of the sum of the square of the bench test determined thermocouple reproducibility error and the square of the bench test reference thermocouple error. For example, using ring number 1 top thermocouple locations, the overall uncertainty is the square root of $((2.4)^2+1^2)$, which is 2.6° F. Performing this calculation for the values in the table below, there was a measurement uncertainty of ≤±5° F., at 95% confidence.

Additional post-service validation tests of thermocouple assemblies 100 removed from various field applications in harsh and radiological operating environments showed no evidence of degradation in accuracy following extended high temperature thermal cycling. These measurement uncertainties have been obtained on both as-fabricated assemblies 100 as well as the same assemblies 100 post service. Other methods known to those of skill in the art may be used without departing from the scope of the present subject matter.

It is understood that the embodiments and methods above are exemplary only, as many additional changes in the details, materials, steps and arrangement of parts, which have been herein described and illustrated to explain the nature of the subject matter, may be made by those skilled in the art without departing from the principle or scope of the present subject matter.

We claim:

1. A thermocouple assembly, comprising:
   a resilient mount;
   a resilient buffer attached to the resilient mount, the resilient buffer having a first side and a second side attached to the first side so that a first gap separates the first side from the second side, wherein the first side of the resilient buffer is adjacent to and directly attached to the resilient mount;
   an insulator having a first side and a second side, wherein the insulator is affixed between the first and second side of the resilient buffer; and
   a thermocouple positioned adjacent the insulator, the thermocouple having a first side and a second side, the thermocouple first side attached to the insulator second side, and the thermocouple second side being configured to be in thermal contact with an object to be measured,
   wherein
      the insulator is configured to maintain the thermocouple in consistent constant thermal contact with the object to be measured, and
      the first gap is compressible and configured to seal the thermocouple from ambient air.

2. The thermocouple assembly of claim 1, wherein the second side of the resilient buffer extends only to the thermocouple position.

3. The thermocouple assembly of claim 2, wherein the thermocouple creates a second gap between the second side of the resilient buffer and the insulator second side.

4. The thermocouple assembly of claim 1, wherein the resilient buffer includes a bend connected to a first end of the first side of the resilient buffer and a first end of the second side of the resilient buffer so that the resilient buffer has a U-shape.

5. The thermocouple assembly of claim 1, wherein the resilient mount is circular.

6. The thermocouple assembly of claim 5, wherein the resilient mount is configured to compensate for thermal expansion of the object to be measured.

7. The thermocouple assembly of claim 5, wherein the thermocouple is bi-metallic and passively self-energized.

8. The thermocouple assembly of claim 1, wherein the thermocouple, insulator, and the resilient buffer can withstand temperatures above 450° F.

9. The thermocouple assembly of claim 8, wherein the thermocouple, insulator, and the resilient buffer can withstand temperatures up to 550° F.

10. The thermocouple assembly of claim 8, wherein the thermocouple, insulator, and the resilient buffer can withstand temperatures up to 750° F.

* * * * *